United States Patent
Georgin

(10) Patent No.: US 9,981,754 B2
(45) Date of Patent: *May 29, 2018

(54) SYSTEM AND METHOD FOR DETECTING BAD RUNWAY CONDITIONS

(71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 110 days.

This patent is subject to a terminal disclaimer.

(21) Appl. No.: 14/940,918

(22) Filed: Nov. 13, 2015

(65) Prior Publication Data

US 2017/0137144 A1  May 18, 2017

(51) Int. Cl.

| G08B 21/00 | (2006.01) |
|---|---|
| B64D 45/00 | (2006.01) |
| B64C 25/42 | (2006.01) |
| B60T 8/17 | (2006.01) |
| B60T 8/171 | (2006.01) |
| B60T 8/172 | (2006.01) |
| G08G 5/00 | (2006.01) |
| G08G 5/06 | (2006.01) |

(52) U.S. Cl.
CPC .............. *B64D 45/00* (2013.01); *B60T 8/171* (2013.01); *B60T 8/172* (2013.01); *B60T 8/1703* (2013.01); *B64C 25/426* (2013.01); *G08G 5/0021* (2013.01); *G08G 5/0086* (2013.01); *G08G 5/065* (2013.01); *B60T 2240/06* (2013.01)

(58) Field of Classification Search
None
See application file for complete search history.

(56) References Cited

U.S. PATENT DOCUMENTS

| 8,738,201 | B2 | 5/2014 | Edwards et al. |
|---|---|---|---|
| 8,773,289 | B2 | 7/2014 | Maggiore et al. |
| 8,965,657 | B2 * | 2/2015 | Georgin ................ B64C 25/42 244/111 |
| 2015/0039200 | A1 | 2/2015 | Rado |
| 2015/0203194 | A1 * | 7/2015 | Griffith ................ B64C 25/46 701/3 |
| 2015/0254990 | A1 * | 9/2015 | Raby .................... B64C 25/426 701/16 |

FOREIGN PATENT DOCUMENTS

| EP | 2821301 | 1/2015 |
|---|---|---|
| EP | 2899079 | 7/2015 |

OTHER PUBLICATIONS

Extended European Search Report dated May 18, 2017 in European Application No. 16198202.0.

\* cited by examiner

*Primary Examiner* — Thomas McCormack
(74) *Attorney, Agent, or Firm* — Snell & Wilmer, L.L.P.

(57) ABSTRACT

Systems and methods for detecting runway conditions are disclosed. A weight on wheel system may determine that an aircraft is on the ground. Wheel speed sensors may measure the speed of the aircraft wheels. Axle reference speeds may be calculated for each landing gear based on the speed of the aircraft wheels. A weight on wheel time limit may be reached prior to the axle reference speeds reaching an on ground threshold. A brake control unit may determine that the runway is contaminated if the on ground threshold was not reached.

17 Claims, 5 Drawing Sheets

SYSTEM AND METHOD FOR DETECTING BAD RUNWAY CONDITIONS

FIELD

The present disclosure relates to brake control systems, and more particularly, to detecting runway conditions with brake control systems.

BACKGROUND

Aircraft landing gears are typically equipped with brakes in order to stop an aircraft after landing. Applying the brakes before the wheels have accelerated to a sufficient velocity after touchdown may cause the wheels to lock and can cause damage to the wheels and aircraft. Aircraft may have systems that prevent braking until detecting that the aircraft is on the ground. For example, a weight on wheel ("WOW") system may detect a weight on the landing gear and determine that the aircraft is on the ground. Additionally, a brake control unit may calculate an aircraft reference speed using wheel speed sensors. In response to calculating a sufficient aircraft reference speed based on an average of the wheel speed sensors, the brake control unit may determine that the aircraft is on the ground and that the wheels have accelerated to a sufficient velocity to allow braking to occur safely.

SUMMARY

A method for detecting a runway condition may comprise detecting that an aircraft is on a runway with a weight on wheel system, transitioning to an on ground condition, wherein the on ground condition permits braking of the aircraft, and determining that the runway is contaminated due to the transitioning being due to expiration of a weight on wheel time limit.

In various embodiments, the method may comprise determining that a touchdown portion of the runway is contaminated. A condition of a braking portion of the runway may be determined. A notification may be transmitted that the runway is contaminated. The method may comprise delaying application of a braking force to at least one of a first landing gear or a second landing gear due to a calculated first axle reference speed being less than an on ground threshold speed until expiration of the weight on wheel time limit. The calculating the first axle reference speed may comprise measuring a wheel speed of a wheel on the first landing gear. The calculating the first axle reference speed may comprise averaging a wheel reference speed of a plurality of wheels on the first landing gear. The method may comprise measuring, using a wheel speed sensor coupled to an outboard wheel on the first landing gear, a raw outboard wheel speed of the outboard wheel; measuring, using a wheel speed sensor coupled to an inboard wheel on the first landing gear, a raw inboard wheel speed of the inboard wheel; filtering the raw outboard wheel speed and the raw inboard wheel speed to obtain filtered wheel speeds; calculating, based on the filtered wheel speeds, an outboard reference speed of the outboard wheel and an inboard reference speed of the inboard wheel; and averaging the outboard reference speed and the inboard reference speed in order to calculate the first axle reference speed.

A method of detecting a runway condition may comprise determining when an aircraft is on a runway, monitoring an elapsed time initiated at when the aircraft was determined to be on the runway, calculating an on ground threshold speed, measuring at least one axle reference speed, and determining whether or not the runway is contaminated based on whether the at least one axle reference speed exceeds the on ground threshold speed before the elapsed time exceeds a weight on wheel time limit.

In various embodiments, an airport may be notified that the landing portion of the runway is contaminated. The on ground threshold may be a speed that allows antiskid braking to be utilized. The determining whether or not the runway is contaminated may comprise measuring, using a wheel speed sensor coupled to an outboard wheel on a left landing gear, a raw outboard wheel speed of the outboard wheel; measuring, using a wheel speed sensor coupled to an inboard wheel on the left landing gear, a raw inboard wheel speed of the inboard wheel; filtering the raw outboard wheel speed and the raw inboard wheel speed to obtain filtered wheel speeds; calculating, based on the filtered wheel speeds, an outboard reference speed of the outboard wheel and an inboard reference speed of the inboard wheel; and averaging the outboard reference speed and the inboard reference speed in order to calculate the first axle reference speed. The determining whether or not the runway is contaminated may be performed prior to a braking force being applied to the aircraft. The method may comprise preventing braking in response to at least one axle reference speed being less than the on ground threshold. A wheel reference speed may be calculated for each wheel of the aircraft, and it may be determined that each wheel reference speed is greater than the on ground threshold.

A system for detecting a runway condition may comprise a first wheel speed sensor coupled to a first landing gear of an aircraft; a second wheel speed sensor coupled to a second landing gear; and a brake control unit, wherein the brake control unit performs operations comprising: calculating a first axle reference speed for the first landing gear; calculating a second axle reference speed for the second landing gear; and determining, in response to the first axle reference speed and the second axle reference speed both being greater than an on ground threshold prior to a weight on wheel time limit, that a touchdown portion of a runway is not contaminated.

In various embodiments, the operations may further comprise commanding, by the brake control unit, a braking force to be applied to at least one of the first landing gear and the second landing gear in response to the determining that the aircraft is in an on ground condition. The first axle reference speed may be greater than the second axle reference speed due to a contaminant on the runway. A notification may be transmitted that the touchdown portion of the runway is not contaminated. The brake control unit may prevent braking in response to either the first axle reference speed or the second axle reference speed being less than the on ground threshold.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
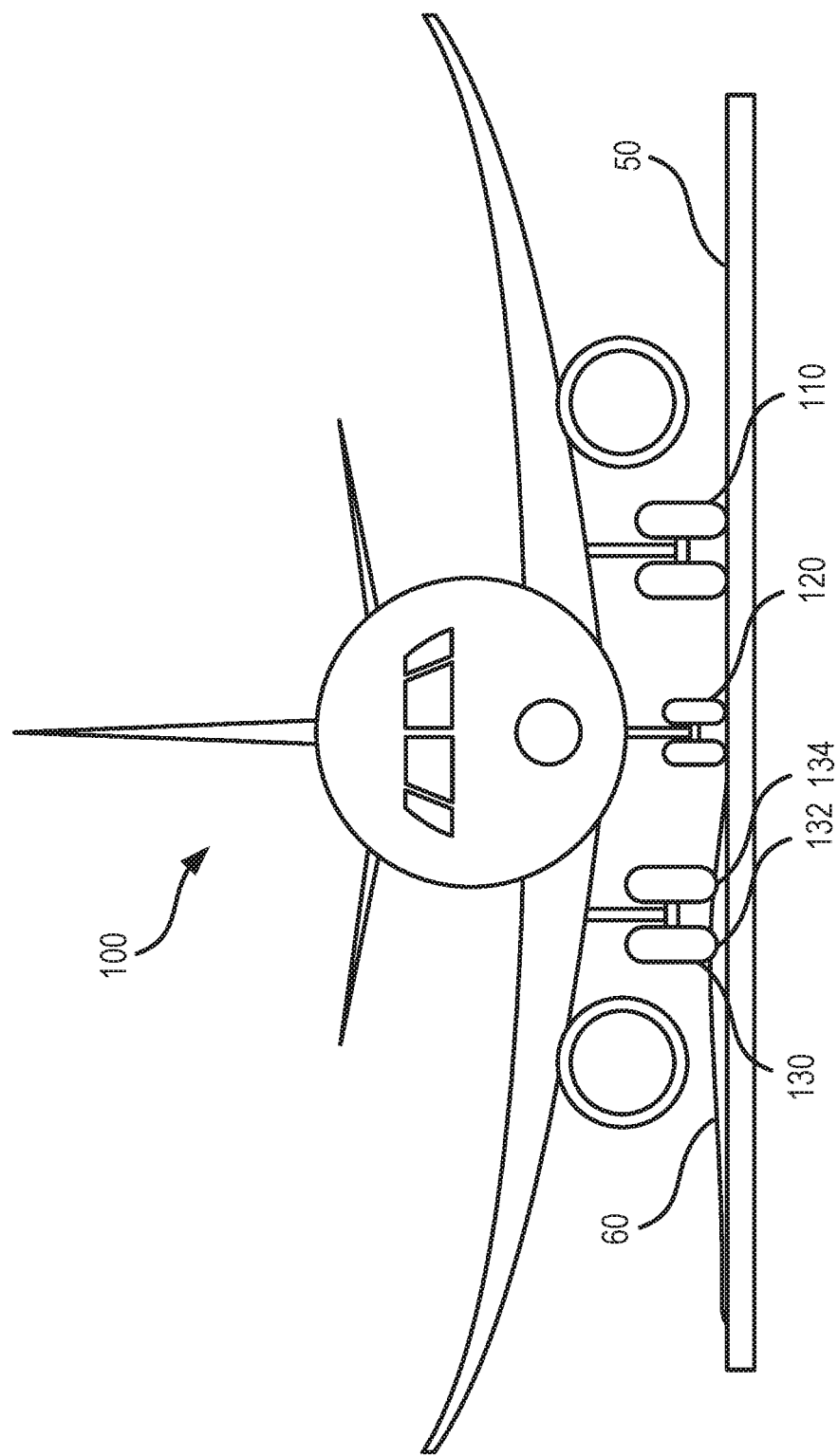
FIG. 1 illustrates, in accordance with various embodiments, a front view of an aircraft on a contaminated runway.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods for detecting runway conditions by an aircraft are disclosed. A weight on wheel ("WOW") system may detect a weight on the landing gear of an aircraft and determine that the aircraft is on the ground. Additionally, an axle reference speed may be calculated for a plurality of axles. In response to determining that the axle reference speeds are greater than a minimum reference speed for each of the plurality of axles, a brake control unit may allow braking to be applied to the wheels. In various embodiments, braking may be allowed if an average reference speed for the plurality of axles is greater than the minimum reference speed. If the minimum reference speed is reached prior to a WOW time limit, the system may determine that runway conditions are good. As used herein, "good" runway conditions refer to a runway with a sufficiently high coefficient of friction such that wheels are able to spin up to the minimum reference speed prior to the WOW time limit. Good or uncontaminated runway conditions may represent a runway that is dry and free of contaminants such as ice.

In response to a set time elapsing after the WOW has determined that the aircraft is on the ground, the brake control system may allow braking regardless of the calculated reference speeds. If the WOW time limit is reached before at least one of the axles has reached the minimum reference speed, the BCU may determine that the runway is contaminated, such as due to ice or water. The BCU may notify airport personnel that the portion of the runway which the aircraft was on prior to braking is contaminated. A contaminated runway may have a lower coefficient of friction than an uncontaminated runway due to the contaminants.

Conventional methods may be used to determine runway conditions where aircraft are braking, such as by determining if antiskid systems were employed during braking. The airport personnel may combine this information to form a complete picture of runway conditions for the entire runway. The runway conditions may be relayed to subsequently landing aircraft, or used to inform airport personnel that runway maintenance is desirable.

Referring to FIG. 1, a front view of an aircraft 100 on a runway 50 is illustrated according to various embodiments. Aircraft 100 may comprise landing gear including left main landing gear ("LMLG") 110, nose landing gear ("NLG") 120, and right main landing gear ("RMLG") 130. Each gear may comprise two wheels. For example, RMLG 130 comprises right outboard wheel 132 and right inboard wheel 134. However, in various embodiments, aircraft 100 may comprise any number of gears, and each gear may comprise any number of wheels. For example, a bogie type landing gear may comprise two or more axles with two wheels per axle. The bogie type landing gear may comprise a fore axle with an inboard wheel and an outboard wheel, and an aft axle with an inboard wheel and an outboard wheel for one or more gear.

Aircraft 100 is illustrated during spin up shortly after landing on runway 50. Spin up refers to the portion of landing during which friction between the landing surface and the wheels causes the wheels to accelerate. Runway 50 may comprise contaminant 60. Contaminant 60 may comprise any substance which causes an aircraft wheel and/or aircraft tire to at least partially slip on contaminant 60. For example, in various embodiments, contaminant 60 may comprise ice, snow, water, jet fuel, oil, diesel fuel, and/or a degraded runway surface due to potholes or other non-uniformities. In various embodiments, contaminant 60 may be a relatively slick portion of the pavement of runway 50 itself. In that regard, contaminant 60 may comprise any portion of runway 50 that has a different coefficient of friction than another portion of runway 50.

Figure 2:
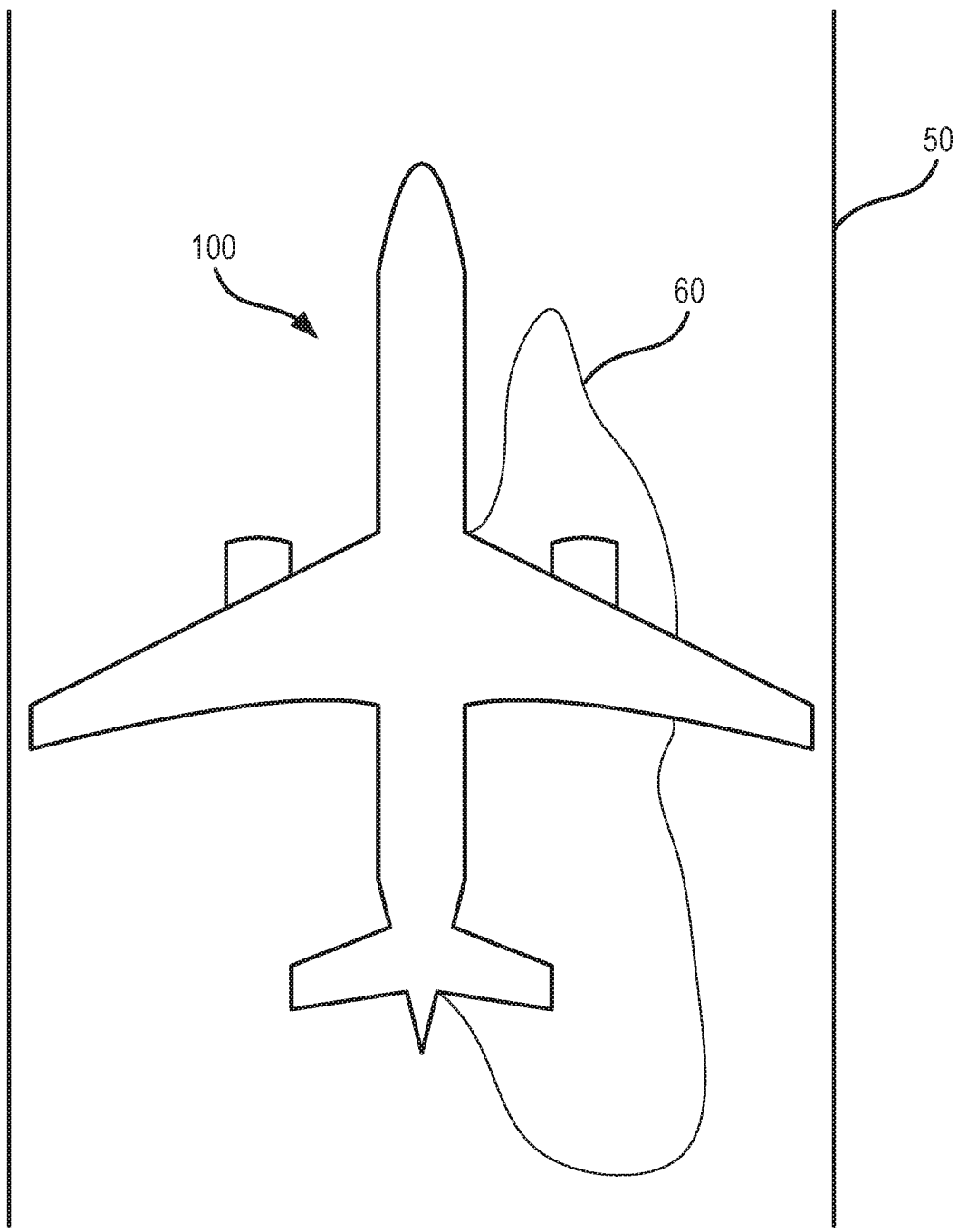
FIG. 2 illustrates, in accordance with various embodiments, a top view of an aircraft on a contaminated runway.

Referring to FIG. 2, a top view of aircraft 100 on runway 50 is illustrated according to various embodiments. As illustrated, contaminant 60 covers a portion of runway 50. Thus, in various embodiments, one or more aircraft wheels may be in contact with contaminant 60, while one or more aircraft wheels may be in contact with the pavement of runway 50. Different coefficients of friction of runway 50 and contaminant 60 may cause the aircraft wheels to spin up at varying rates. In various embodiments, LMLG 110 may spin up faster than RMLG 130 due to a higher coefficient of friction for runway 50 than for contaminant 60. In various embodiments, runway 50 may comprise multiple contaminants, such as ice and snow, each with a different coefficient of friction.

Figure 3:
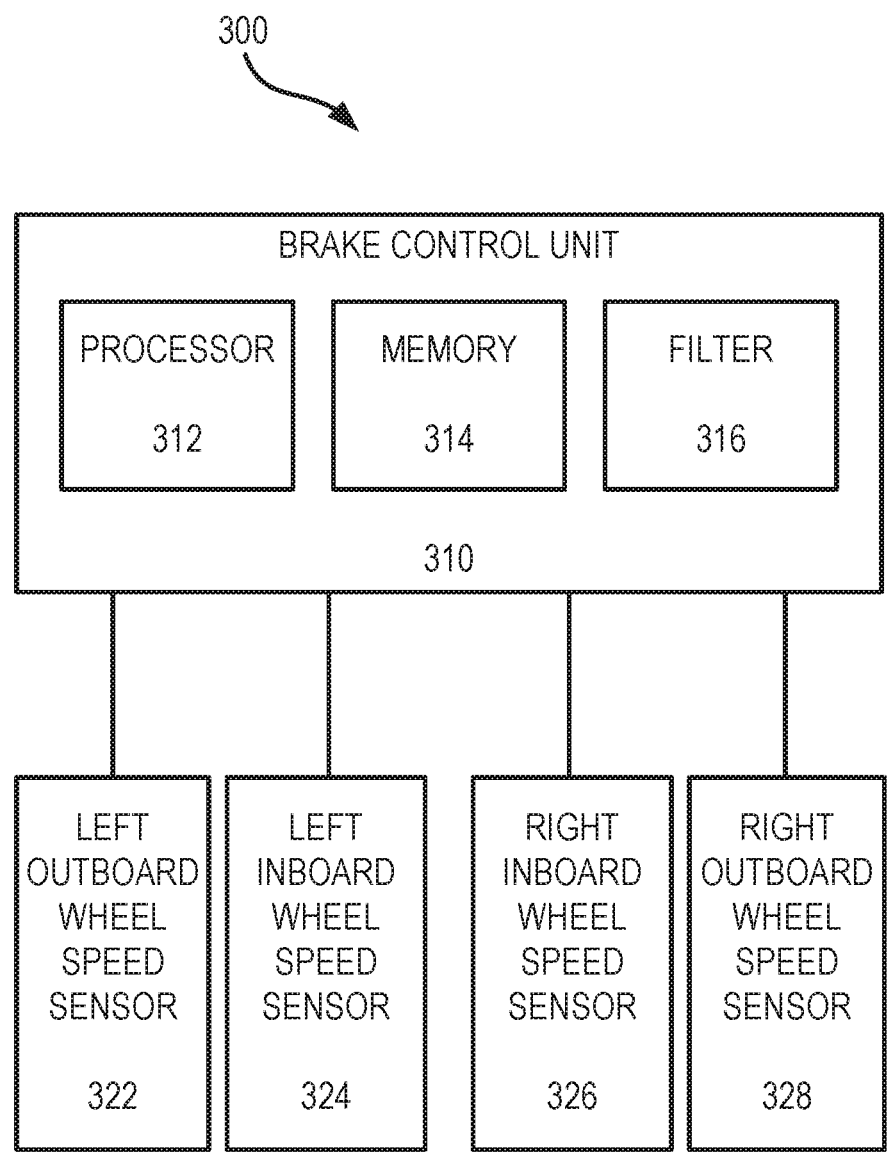
FIG. 3 illustrates, in accordance with various embodiments, a block diagram of a portion of a brake control system.

Referring to FIG. 3, a system 300 for detecting runway conditions is illustrated according to various embodiments. System 300 may comprise brake control unit ("BCU") 310, left outboard wheel speed sensor 322, left inboard wheel speed sensor 324, right inboard wheel speed sensor 326, and right outboard wheel speed sensor 328. In various embodiments, LMLG 110 and RMLG 130 may each comprise four or more wheels, and a wheel speed sensor may be coupled to each wheel of LMLG 110 and RMLG 130. For example, LMLG 110 may comprise a fore axle comprising a wheel speed sensor coupled to each of an inboard wheel and an outboard wheel, and an aft axle comprising a wheel speed sensor coupled to each of an inboard wheel and an outboard wheel. The various components may be electrically coupled. In various embodiments, the various components may communicate via wireless communications. For example, the wheel speed sensors may wirelessly transmit wheel speed measurements to BCU 310.

Brake control unit 310 may comprise a computing device (e.g., processor 312) and an associated memory 314. The memory 314 may comprise an article of manufacture including a tangible, non-transitory computer-readable storage medium having instructions stored thereon that, in response to execution by a computing device (e.g., processor 312), cause the computing device to perform various methods.

Filter 316 may be configured to filter data received from the wheel speed sensors. In various embodiments, filter 316 may comprise a low pass filter to reduce or eliminate high frequency noise. Filter 316 may further comprise a gear walk filter which may filter vibrations in a specific, narrow frequency range due to fore and aft oscillations of the landing gear. The frequency range may vary based on the aircraft structure. Generally, the frequency range may be higher for small aircraft and lower for large aircraft.

The wheel speed sensors may measure a raw wheel speed. The wheel speed sensors may comprise any device capable of measuring a raw wheel speed. For example, in various embodiments, the wheel speed sensors may comprise electromagnetic transducers or fiber optic transducers. In various embodiments, the wheel speed sensors may comprise an AC sensor which uses a magnet surrounded by a pickup coil in an axle of the landing gear. In various embodiments, the wheel speed sensors may comprise a DC sensor which may comprise a permanent magnet direct current generator, which outputs a voltage proportional to a rotational speed of its armature. Additionally, the wheel speed sensors may detect a change in a rate of deceleration of the wheels and may transmit a signal to BCU 310, which may determine whether braking pressure should be altered in order to assist in antiskid braking.

The raw wheel speed is the actual measured speed of the wheel. In various embodiments, each wheel on aircraft 100 may be equipped with a wheel speed sensor. However, in various embodiments, aircraft 100 may comprise one wheel speed sensor per axle pair, one wheel speed sensor per gear, or may only comprise wheel speed sensors on the main landing gears. The wheel speed sensors may transmit the raw wheel speed data to BCU 310. BCU 310 may calculate a reference wheel speed for each wheel. The reference wheel speed may be the over ground speed that the wheel would be travelling if the wheel were rolling without slipping. For example, if the wheel speed sensor measures a raw wheel speed of 10 radians per second for a wheel with a radius of 0.5 meters (1.6 ft), BCU 310 may calculate a reference wheel speed of 5 meters per second (11 mph). During spin up and subsequent braking, wheels may be at least partially slipping. Thus, the wheel reference speed may be less than the actual speed of aircraft 100 during spin up and braking.

Figure 4:
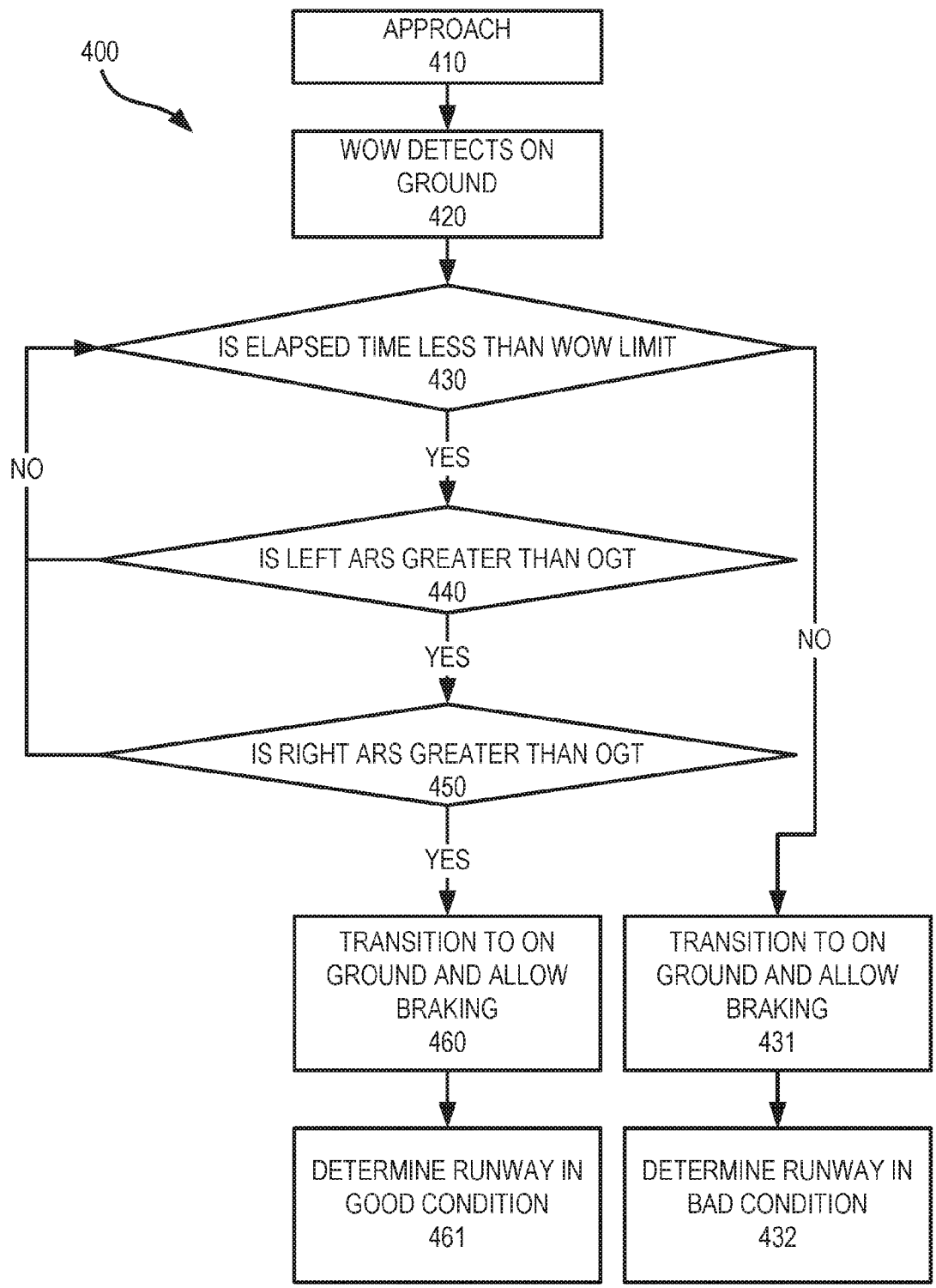
FIG. 4 illustrates, in accordance with various embodiments, a method for determining a runway condition.

Referring to FIG. 4, a process 400 for detecting runway conditions is illustrated according to various embodiments. As aircraft 100 prepares for landing, BCU 310 may be in approach mode (Step 410). In approach mode, BCU 310 may prevent wheel braking in order to prevent damage to the wheels and/or aircraft 100 at touchdown. BCU 310 may prevent wheel braking until a reference speed of each axle of LMLG 110 and a reference speed of each axle of RMLG 130 are each above an on ground threshold. In various embodiments, where LMLG 110 and RMLG 130 comprise multiple axle pairs, BCU 310 may prevent wheel braking until a reference speed of each axle pair of LMLG 10 and RMLG 130 is above the on ground threshold. The value for the on ground threshold ("OGT") may vary based on aircraft and wheel specifications. For example, in various embodiments, OGT may be from about 10 meters per second ("m/s") to about 50 m/s (20 mph-110 mph), from about 15 m/s to about 40 m/s (34 mph-89 mph), and from about 20 m/s to about 30 m/s (45 mph-67 mph), where the term "about" in this context may refer to +/−1 m/s. In response to the reference speed of each axle of LMLG 110 and the reference speed of each axle of RMLG 130 being above the OGT, antiskid braking may be utilized if appropriate to decelerate aircraft 100. In various embodiments, OGT may also comprise an acceleration threshold component. BCU 310 may calculate an axle reference acceleration for each axle, and BCU 310 may prevent braking until the axle reference acceleration for each axle is below an acceleration threshold. During spin up, the axles may be accelerating. The acceleration may decrease as the axles approach the end of spin up. In response to calculating an axle reference acceleration below the acceleration threshold, BCU 310 may allow braking to be applied. In various embodiments, the acceleration threshold may be zero or near zero, such as 0.1 $m/s^2$ (0.3 $ft/s^2$), or 1 $m/s^2$ (3 $ft/s^2$). In various embodiments, the acceleration threshold may be measured in angular acceleration.

In response to the landing gear making contact with the ground, a weight on wheel ("WOW") system may determine that aircraft 100 is on the ground (Step 420). The WOW system may detect a pressure between the landing gear and the aircraft body due to the gravitational force applying the weight of aircraft 100 on the landing gear. In various embodiments, the WOW system may comprise proximity sensors that detect a compression of the landing gear. The WOW system may monitor an elapsed time initiated at when the aircraft was determined to be on the runway.

In various embodiments, BCU 310 may comprise a WOW time limit which may begin at the point that the WOW system determines that aircraft 100 is on the ground. In response to the time limit expiring, BCU 310 may allow braking regardless of whether the wheels have sufficiently spun up. Thus, even if one or more ARS's have not reached the OGT, BCU 310 may allow braking after a set period of time, as possibly damaging the wheels may be preferable to not stopping aircraft 100 at all. The WOW time limit may vary for different aircraft and runways, however, in various embodiments, the WOW time limit may be between from about 2 s to 15 s, from about 3 s to about 12 s and from about 5 s to about 10 s, where the term "about" in this context may refer to 1 s. In various embodiments, the WOW time limit may be fixed. However, in various embodiments, in response to determining that the wheels have spun up within a certain percentage of OGT, such as 90% or 60%, BCU 310 may extend the WOW time limit in order to allow for the wheels to reach OGT.

BCU 310 may determine whether an elapsed time is less that the WOW time limit (Step 430). The elapsed time may refer to the difference in time between the WOW on ground detection and the determining being performed by BCU 310. In response to the elapsed time being greater than the WOW time limit, BCU 310 may transition to on ground condition and allow braking (step 431).

In response to the BCU 310 transitioning to on ground due to expiration of the WOW time limit, the BCU 310 may determine that the wheels were not able to spin up sufficiently within the WOW time limit, and the BCU 310 may determine that the runway is contaminated (step 432). The BCU 310 may transmit a notification to airport personnel that the runway is contaminated. In various embodiments, this notification may occur prior to or simultaneous to the application of brakes to the aircraft wheels.

However, in response to the elapsed time being less than the WOW time limit, the BCU 310 may determine whether the wheels have sufficiently spun up to allow braking. The BCU 310 may determine whether a left axle reference speed ("ARS") is greater than the OGT (Step 440). Left outboard wheel speed sensor 322 and left inboard wheel speed sensor 324 may transmit raw wheel speed data to BCU 310. Filter 316 may filter the raw wheel speed data to decrease noise in the data. BCU 310 may calculate wheel reference speeds for the left outboard wheel and the left inboard wheel using the filtered wheel speed data. BCU 310 may calculate a left ARS as a function of the reference speeds for the left outboard wheel and the left inboard wheel. For example, in various embodiments, BCU 310 may average the reference speeds for the left outboard wheel and the left inboard wheel in order to obtain the left ARS. In various embodiments, BCU 310 may calculate a left fore ARS and a left rear ARS. In various embodiments, the function may comprise a weighted average of the reference speeds of the left outboard wheel and the left inboard wheel. In various embodiments, LMLG 110 may only comprise a single wheel, and the left ARS may be the same as the reference speed for the single wheel. Similarly a right ARS may be calculated based on data from right inboard wheel speed sensor 326 and right outboard wheel speed sensor 328.

In response to calculating a left ARS that is less than the OGT, BCU 310 may continue to prevent braking and remain in approach or touchdown condition. In response to determining that the left ARS is greater than the OGT, BCU 310 may determine whether a right ARS is greater than the OGT (Step 450). In various embodiments, BCU 310 may require that a left fore ARS and a left aft ARS are greater than the OGT prior to determining whether a right ARS is greater than the OGT. In various embodiments, the right ARS may be calculated prior to the left ARS, or in various embodiments, the left ARS and the right ARS may be calculated simultaneously. In various embodiments, the left ARS and the right ARS may be continuously calculated while aircraft 100 is in approach or touchdown mode. BCU 310 may require reference speeds for the axles of both LMLG 110 and RMLG 130 to be above the OGT prior to braking in order to prevent wheels which have not fully spun up from locking due to premature braking. For example, referring back to FIG. 1, the wheels on RMLG 130 may be slipping on contaminant 60. Thus, the axles of LMLG 110 may reach the OGT prior to the axles of RMLG 130. In various embodiments, BCU 310 prevents braking until the axles of both LMLG 110 and RMLG 130 reach the OGT, even though an average of the left ARS and the right ARS may be above the OGT. In various embodiments, BCU 310 prevents braking until determining that each wheel of the main landing gears of aircraft 100 has reached the OGT.

In response to both the left ARS and the right ARS being greater than the OGT, BCU 310 may transition to the on ground condition and allow wheel braking to occur (Step 460). At this point BCU 310 may allow braking input from the cockpit to be applied to the brakes, and aircraft 100 may be safely stopped. In various embodiments, aircraft 100 may comprise three or more main landing gears. BCU 310 may command that a reference speed for the axles of each landing gear of aircraft 100 be greater than the OGT prior to transitioning to the on ground condition.

The BCU 310 may determine that the wheels were able to spin up within the WOW time limit, and the BCU 310 may determine that the runway is in good condition (i.e. not contaminated), and the BCU 310 may transmit a notification to the airport personnel that the runway is in good condition (step 461).

In various embodiments, the BCU 310 may determine that one or both sides of the runway are contaminated. For example, in response to the left ARS not reaching the OGT prior to the WOW time limit, the BCU 310 may determine that the left half of the runway is contaminated. Similarly, in response to the right ARS not reaching the OGT prior to the WOW time limit, the BCU 310 may determine that the right half of the runway is contaminated.

Figure 5:
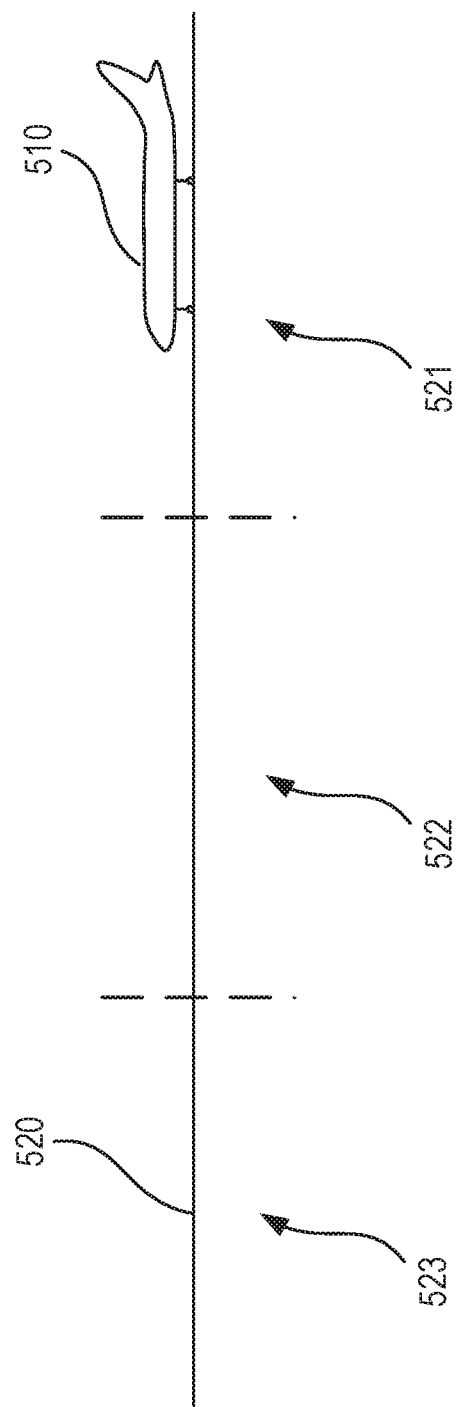
FIG. 5 illustrates, in accordance with various embodiments, a side view of an aircraft landing on a runway.

Referring to FIG. 5, a side view of an aircraft 510 landing on a runway 520 is illustrated according to various embodiments. In general, the aircraft 510 may land on a touchdown portion 521 of the runway 520. Throughout the touchdown portion 521, the wheels are spinning up, and braking is not applied to the aircraft wheels. In the braking portion 522 of the runway 520, the aircraft 510 may apply a braking force to the wheels, and the aircraft may decelerate to a desired speed for taxiing. In the taxi portion 523 of the runway 520, the aircraft 510 may be finished braking and may taxi to its final position. The touchdown portion 521, the braking portion 522, and the taxi portion 523 may not be located at fixed locations on the runway 520, but rather may refer generally to the stages of braking during the landing process.

The aircraft may obtain runway information for the touchdown portion 521 of the runway 520 before wheel braking is applied by comparing wheel spin-up time to WOW time as described herein. Runway information for the braking portion 522 and the taxi portion 523 may be obtained using conventional methods. Thus, the present disclosure allows for a complete picture of runway conditions to be obtained. This information may be utilized to inform incoming aircraft of the runway conditions in order to better prepare them for landing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for detecting a runway condition comprising:
   detecting that an aircraft is on a runway with a weight on wheel system;
   transitioning to an on ground condition, wherein the on ground condition permits braking of the aircraft; and
   determining that the runway is contaminated due to the transitioning being due to expiration of a weight on wheel time limit; and
   delaying application of a braking force to at least one of a first landing gear or a second landing gear due to a calculated first axle reference speed being less than an on ground threshold speed until expiration of the weight on wheel time limit, wherein calculating the first axle reference speed comprises averaging a wheel reference speed of a plurality of wheels on the first landing gear.

2. The method of claim 1, further comprising determining that a touchdown portion of the runway is contaminated.

3. The method of claim 2, further comprising determining a condition of a braking portion of the runway.

4. The method of claim 1, further comprising transmitting a notification that the runway is contaminated.

5. The method of claim 1, wherein calculating the first axle reference speed comprises measuring a wheel speed of a wheel on the first landing gear.

6. The method of claim 1, further comprising:
   measuring, using a wheel speed sensor coupled to an outboard wheel on the first landing gear, a raw outboard wheel speed of the outboard wheel;
   measuring, using a wheel speed sensor coupled to an inboard wheel on the first landing gear, a raw inboard wheel speed of the inboard wheel;
   filtering the raw outboard wheel speed and the raw inboard wheel speed to obtain filtered wheel speeds;
   calculating, based on the filtered wheel speeds, an outboard reference speed of the outboard wheel and an inboard reference speed of the inboard wheel; and
   averaging the outboard reference speed and the inboard reference speed in order to calculate the first axle reference speed.

7. A method of detecting a runway condition, using an aircraft brake control unit, comprising:
   determining, using a weight on wheel system, when an aircraft is on a runway;
   monitoring an elapsed time initiated at when the aircraft was determined to be on the runway;
   calculating an on ground threshold speed;
   measuring, using a wheel speed sensor coupled to at least one wheel of the aircraft, at least one axle reference speed; and
   determining whether or not the runway is contaminated based on whether the at least one axle reference speed exceeds the on ground threshold speed before the elapsed time exceeds a weight on wheel time limit.

8. The method of claim 7, further comprising notifying an airport that a touchdown portion of the runway is contaminated.

9. The method of claim 7, wherein the on ground threshold is a speed that allows antiskid braking to be utilized.

10. The method of claim 7, wherein the determining whether or not the runway is contaminated comprises:
    measuring, using a wheel speed sensor coupled to an outboard wheel on a left landing gear, a raw outboard wheel speed of the outboard wheel;
    measuring, using a wheel speed sensor coupled to an inboard wheel on the left landing gear, a raw inboard wheel speed of the inboard wheel;
    filtering the raw outboard wheel speed and the raw inboard wheel speed to obtain filtered wheel speeds;
    calculating, based on the filtered wheel speeds, an outboard reference speed of the outboard wheel and an inboard reference speed of the inboard wheel; and
    averaging the outboard reference speed and the inboard reference speed in order to calculate the first axle reference speed.

11. The method of claim 7, wherein the determining whether or not the runway is contaminated is performed prior to a braking force being applied to the aircraft.

12. The method of claim 7, further comprising preventing braking in response to the at least one axle reference speed being less than the on ground threshold.

13. The method of claim 7, further comprising calculating a wheel reference speed for each wheel of the aircraft, and determining that each wheel reference speed is greater than the on ground threshold.

14. A system for detecting a runway condition comprising:
    a first wheel speed sensor coupled to a first landing gear of an aircraft;
    a second wheel speed sensor coupled to a second landing gear; and
    a brake control unit, wherein the brake control unit performs operations comprising:
      calculating a first axle reference speed for the first landing gear;
      calculating a second axle reference speed for the second landing gear, wherein the first axle reference speed is greater than the second axle reference speed due to a contaminant on the runway; and
      determining, in response to the first axle reference speed and the second axle reference speed both being greater than an on ground threshold prior to a weight on wheel time limit, that a touchdown portion of a runway is not contaminated.

15. The system of claim 14, wherein the operations further comprise commanding, by the brake control unit, a braking force to be applied to at least one of the first landing gear and the second landing gear in response to the determining that the aircraft is in an on ground condition.

16. The system of claim 14, further comprising transmitting a notification that the touchdown portion of the runway is not contaminated.

17. The system of claim 14, wherein the brake control unit prevents braking in response to either the first axle reference speed or the second axle reference speed being less than the on ground threshold.

* * * * *